(12) United States Patent
Winkler et al.

(10) Patent No.: US 7,363,156 B2
(45) Date of Patent: Apr. 22, 2008

(54) METHOD AND DEVICE FOR ASSISTING IN THE PILOTING OF AN AIRCRAFT

(76) Inventors: Falk Winkler, 650 Route de Gilis, Cintegabelle (FR) 31550; Guillaume Fouet, 85 Bis Allee de Brienne, Toulouse (FR) 31000; Didier Menras, 43 Rue Corneille, Toulouse (FR) 31100

( * ) Notice: Subject to any disclaimer, the term of this patent is extended or adjusted under 35 U.S.C. 154(b) by 0 days.

(21) Appl. No.: 11/678,317

(22) Filed: Feb. 23, 2007

(65) Prior Publication Data
US 2007/0299611 A1 Dec. 27, 2007

(30) Foreign Application Priority Data
Feb. 28, 2006 (FR) .................................. 06 01717

(51) Int. Cl.
*G01S 7/04* (2006.01)
(52) U.S. Cl. .......................................... 701/301; 701/3

(58) Field of Classification Search .................... 701/3, 701/4, 200–213, 300, 301, 302; 342/30, 342/175, 182
See application file for complete search history.

(56) References Cited

U.S. PATENT DOCUMENTS

| 6,262,679 | B1 | 7/2001 | Tran | |
|---|---|---|---|---|
| 6,657,578 | B2 * | 12/2003 | Stayton et al. | ................. 342/30 |
| 6,683,562 | B2 * | 1/2004 | Stayton et al. | .............. 342/182 |
| 2002/0063653 | A1 | 5/2002 | Oey et al. | |
| 2002/0089432 | A1 | 7/2002 | Staggs et al. | |
| 2004/0174295 | A1 | 9/2004 | Stayton et al. | |

FOREIGN PATENT DOCUMENTS

JP      6179180      4/1986

\* cited by examiner

*Primary Examiner*—Richard M. Camby

(57) ABSTRACT

A method and device for assisting in the piloting of an aircraft warning information to be generated if a risk of collision with an aircraft in the vicinity exists and a graphical characteristic representing a corresponding warning signal to be presented, on a display screen, in a vertical plane.

12 Claims, 6 Drawing Sheets

METHOD AND DEVICE FOR ASSISTING IN THE PILOTING OF AN AIRCRAFT

FIELD OF THE INVENTION

The present invention relates to a method and device for assisting in the piloting of an aircraft.

BACKGROUND OF THE RELATED ART

In particular because of increasingly dense air traffic, a risk of collision between two aircraft cannot be completely excluded. Thus, to avoid such a catastrophe being able to happen, warning systems are generally provided on aircraft, these systems being capable of detecting the risks of a collision and of generating avoidance information allowing, where appropriate, such a collision to be prevented. In general, traffic warnings emitted by such warning systems are signaled to the pilot of an aircraft by displaying, on a horizontal representation screen, in particular an ND (navigation display) screen, the aircraft that present a hazard. The flight control to be adopted, in order to perform the avoidance maneuver, is itself usually indicated on a PFD (primary flight display), with for example indication of a recommended vertical speed and indication of a recommended angle (that the aircraft must therefore adopt in order to be able to perform the avoidance maneuver).

Such a standard representation of the traffic warnings has drawbacks. In particular:
 no avoidance command, expressed as a vertical speed, is indicated on the horizontal representation screen, the avoidance command being only indicated on the flight screen. Such a heterogeneous representation assumes, that the pilot's attention is constantly moving from one screen to the other during an avoidance phase, thereby in particular increasing the pilot's workload in such a phase, which is generally critical; and
 no correlation exists with information relating to the terrain. Thus, for example, in flight in automatic formation close to the ground, an avoidance command expressed in the form of a vertical speed command may cause the aircraft's path to interfere with the ground, or the avoidance maneuver cannot be performed with the effectiveness required by the pilot, because of a fear of collision with the very close terrain and/or of the impossibility for the pilot to instantly estimate his immediate environment.

SUMMARY OF THE INVENTION

The present invention relates to a method for assisting in the piloting of an aircraft, which can be used to remedy the abovementioned drawbacks.

To this end, according to the invention said method whereby there is presented, on at least one display screen of said aircraft, a set of information that illustrates a vertical plane and that comprises:
 a system of axes, of which a Y axis is graduated altitude-wise, and an X axis is graduated distance-wise from the position of the aircraft; and
 a characteristic symbol representing the aircraft, which is positioned on said Y axis, in a position representative of the altitude of said aircraft, and is noteworthy in that, during a flight of the aircraft:
a) automatic surveillance of the surroundings of said aircraft is carried out, so as to be able to detect all aircraft in the vicinity that are located in a particular detection space situated at least in front of said aircraft; and
b) for each of the aircraft in the vicinity detected in the step a):
 b1) its actual position is determined; and
 b2) at least on the basis of this actual position of the aircraft in the vicinity, verification is made as to whether a risk of collision with said aircraft exists and, if such a risk exists, warning information is generated; and
c) for each of the aircraft in the vicinity, for which warning information has been generated in step b2), an auxiliary characteristic symbol that represents said aircraft in the vicinity and that is positioned on said system of axes at a position representative of its actual position is presented on said display screen and at least one graphical characteristic representing a warning signal is associated with this auxiliary characteristic symbol.

Thus, with the invention, the pilot of the aircraft is supplied with a graphical representation that provides him with a readily understandable and legible display of the actual situation of his surroundings, in the vertical plane, displaying (by means of said graphical characteristic) any aircraft in the vicinity, for which a risk of collision with the aircraft (on which said method is implemented) exists. In addition, to make it easier to understand the current situation, the vertical position of each aircraft in the vicinity exhibiting a hazard is displayed (by means of the corresponding auxiliary characteristic symbol) in a vertical plane, on which said aircraft (characteristic symbol) is also shown.

Said graphical characteristic representing a warning signal may comprise one of the following features:
 at least one particular graph;
 as least one particular color;
 at least one particular shape; and
 a particular size.

In a preferred embodiment, in step b2):
 the actual position of the aircraft (on which said method is implemented) is determined;
 for each of the aircraft in the vicinity that is detected in step a), the following are determined:
  a horizontal distance corresponding to the distance in a horizontal plane between the actual position of the aircraft and the actual position of said aircraft in the vicinity;
  a vertical distance corresponding to the distance in a vertical plane between the actual position of said aircraft and the actual position of said aircraft in the vicinity; and
  an approach speed between said aircraft and said aircraft in the vicinity; and
 warning information is generated when at least one of the following two conditions A and B is met:
  A/ said horizontal distance is greater than a first threshold value and said vertical distance is greater than a second threshold value;
  B/ said approach speed is greater than a third threshold value.

Furthermore, in a preferred embodiment:
 between step b2) and step c), for at least one aircraft in the vicinity for which warning information has been generated, avoidance information is generated in a step b3), indicating to the pilot of the aircraft one way of avoiding said aircraft in the vicinity; and
 in step c), at least one auxiliary indication means providing this avoidance information is also presented on the display screen.

Preferably, this auxiliary indication means comprises at least one indicator illustrating a limiting flight angle above which the aircraft can perform an avoidance maneuver.

Thus, the pilot of the aircraft is provided, by the display of said indicator, indications allowing him to make an avoidance maneuver in the event of a risk of collision with an aircraft in the vicinity.

In a preferred embodiment, the following operations are also carried out:

- a flight angle of said aircraft is determined, preferably its actual flight angle; and
- in step c) a straight line segment illustrating this flight angle is also presented on the display screen in association with said characteristic symbol.

Thus, it is sufficient for the pilot to fly his aircraft so as to bring its flight angle (represented by said straight line segment) beyond said aforementioned flight angle so as to perform the avoidance maneuver.

Moreover, in step c), to optimally warn the pilot when there is a risk of a collision, an audible warning signal is emitted for at least one item of warning information generated in step b2).

In a preferred embodiment, in step c), an auxiliary characteristic symbol (as mentioned above) is presented on the display screen for any aircraft in the vicinity detected in step a), even if no warning information has been generated for this aircraft in the vicinity in step b2). This allows the pilot to be provided with a complete representation of the air space surrounding his aircraft, giving both the positions of the aircraft representing a collision hazard and those of the non-hazardous aircraft.

In this case, in one particular variant, the auxiliary characteristic symbols corresponding to aircraft in the vicinity that are located outside a corridor defined on either side of a flight path (for example the planned flight path) of the aircraft are displayed on the display screen.

It should be noted that the method according to the invention is particularly suitable for being implemented on an aircraft forming part of an aircraft patrol. It is known that an aircraft patrol (or formation), for example a formation of fighters, is made up of a lead aircraft, also called the leader, that is followed in flight with a particular spacing (defined vertically, longitudinally and laterally) by one or more follower aircraft, also called the wingmen. The relative flight between the leader aircraft and a follower aircraft may be effected:

- either simply (and exclusively) on the basis of the judgment of the pilot of the follower aircraft, according to his direct vision of the lead aircraft;
- or by means of an information and/or flight assistance system, such as an electronic system for assisting in a patrol flight.

In this second case, the fact of being in visual range is no longer a criterion required to operate in formation. The follower aircraft may therefore follow a leader that is not necessarily the aircraft that precedes it a short distance ahead. In particular, it may follow a leader a long distance away or under highly favorable weather conditions, in particular in reduced visibility, for example at night or in heavy rain.

Now, it may be necessary for the pilot of a follower aircraft not only to know the precise position of the various aircraft in the vicinity, but also to know which of these aircraft in the vicinity form part of his patrol and which are foreign to the patrol and are, for example, potentially hazardous. Thus, to assist the pilot in such a situation, the characteristic symbols representing the aircraft in the vicinity that form part of said patrol are advantageously differentiated, on the display screen, from the auxiliary characteristic symbols representing the aircraft in the vicinity that do not form part of said patrol.

Moreover, in a particular embodiment, said display screen comprises at least two display windows, of which a first window comprises said set of information and a second window comprises a set of additional information that illustrates a horizontal plane and that comprises:

- a system of axes graduated distance-wise and bearing-wise;
- a characteristic symbol illustrating the aircraft; and
- auxiliary characteristic symbols illustrating the aircraft in the vicinity that have been detected, and where appropriate provided with a graphical characteristic representative of a warning signal.

Thus, by associating with the graphical representation in the vertical plane according to the invention, a graphical representation in the horizontal plane of the usual type, the pilot can improve his perception of the actual situation of his environment, since the representation in the horizontal plane particularly provides additional information relating to the bearings of the aircraft that are in the vicinity.

The present invention also relates to a device for assisting in the piloting of an aircraft, in particular a transport airplane.

According to the invention, said device of the type comprising display means that can present, on at least one display screen of said aircraft, a set of information that illustrates a vertical plane and that comprises:

- a system of axes, of which a Y axis is graduated altitude-wise, and an X axis is graduated distance-wise from the position of the aircraft; and
- a characteristic symbol representing the aircraft, which is positioned on said Y axis in a position representative of the altitude of said aircraft, is noteworthy in that:

said device also comprises:
- first means for performing an automatic surveillance of the surroundings of said aircraft so as to be able to detect all aircraft in the vicinity that are located in a particular detection space situated at least in front of said aircraft;
- second means for determining the actual position of each of the aircraft in the vicinity detected by said first means; and
- third means for verifying, for each of said aircraft in the vicinity detected, at least on the basis of said actual positions, whether there is a risk of collision with said aircraft and, if such a risk exists, for generating corresponding warning information; and said display means are formed so as to present, on said display screen, for each of the aircraft in the vicinity for which warning information has been generated by said third means:
- an auxiliary characteristic symbol that represents the aircraft in the vicinity in question and is positioned on said system of axes at a position representative of its actual position; and
- at least one graphical characteristic representing a warning signal, which is associated with this auxiliary characteristic symbol.

BRIEF DESCRIPTION OF THE DRAWINGS

The figures of the appended drawing clearly show how the invention can be implemented. In these figures, identical references denote similar elements.

DETAILED DESCRIPTION OF THE INVENTION

Figure 1:
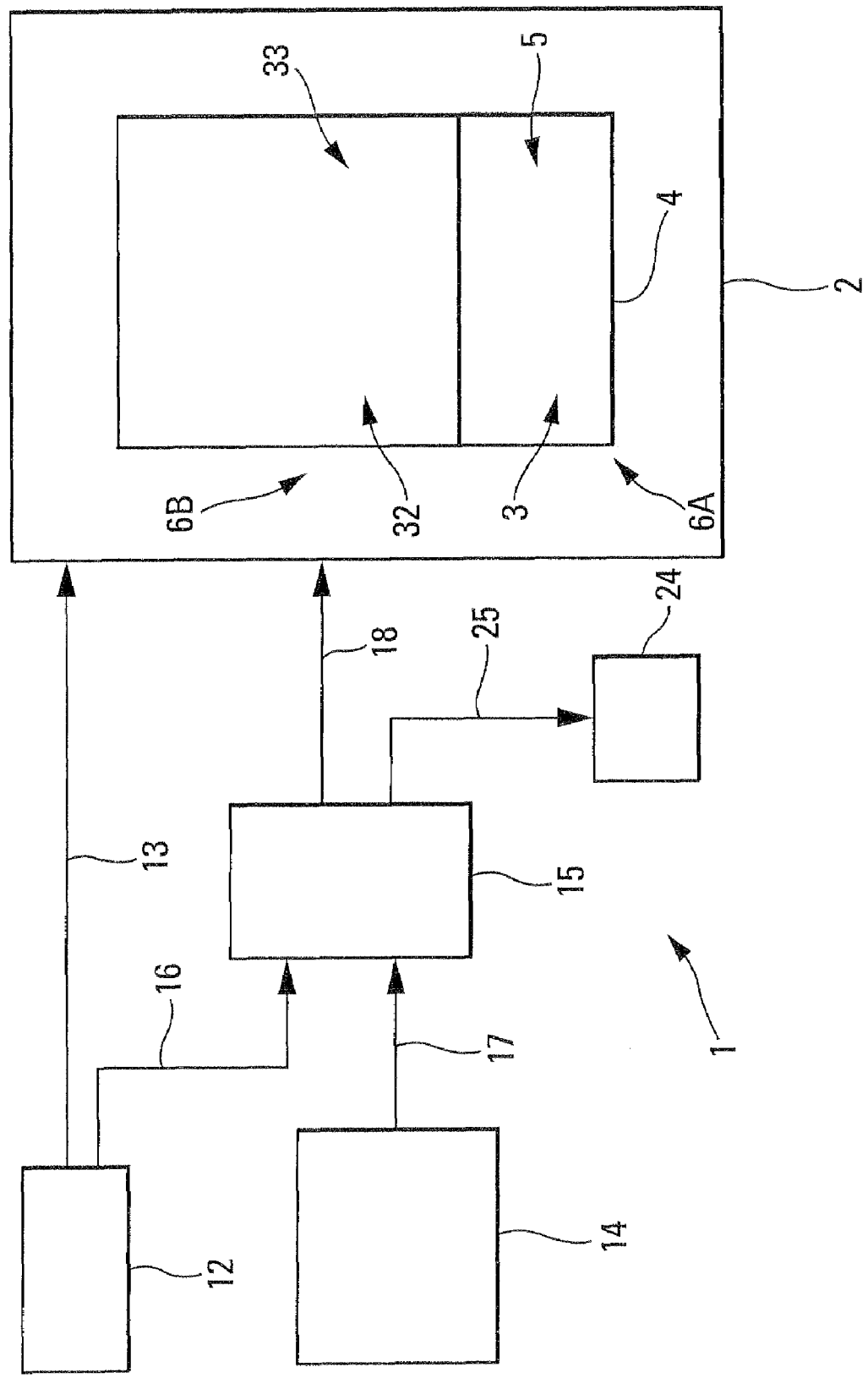
FIG. 1 is the block diagram of an assistance device according to the invention.

The device 1 according to the invention and represented schematically in FIG. 1, is intended to assist operators (pilot, copilot, etc.) of an aircraft, not shown, for example a military transport airplane, when piloting said aircraft.

To do this, said assistance device 1 which is onboard the aircraft, comprises display means 2 which can present, on a display window 3 of a standard display screen 4, a set of information 5 specified below. Said display window 3 can be represented on a part 6A of the display screen 4, for example a bottom part of the latter. It can also be represented over all of said display screen 4.

Figure 2:
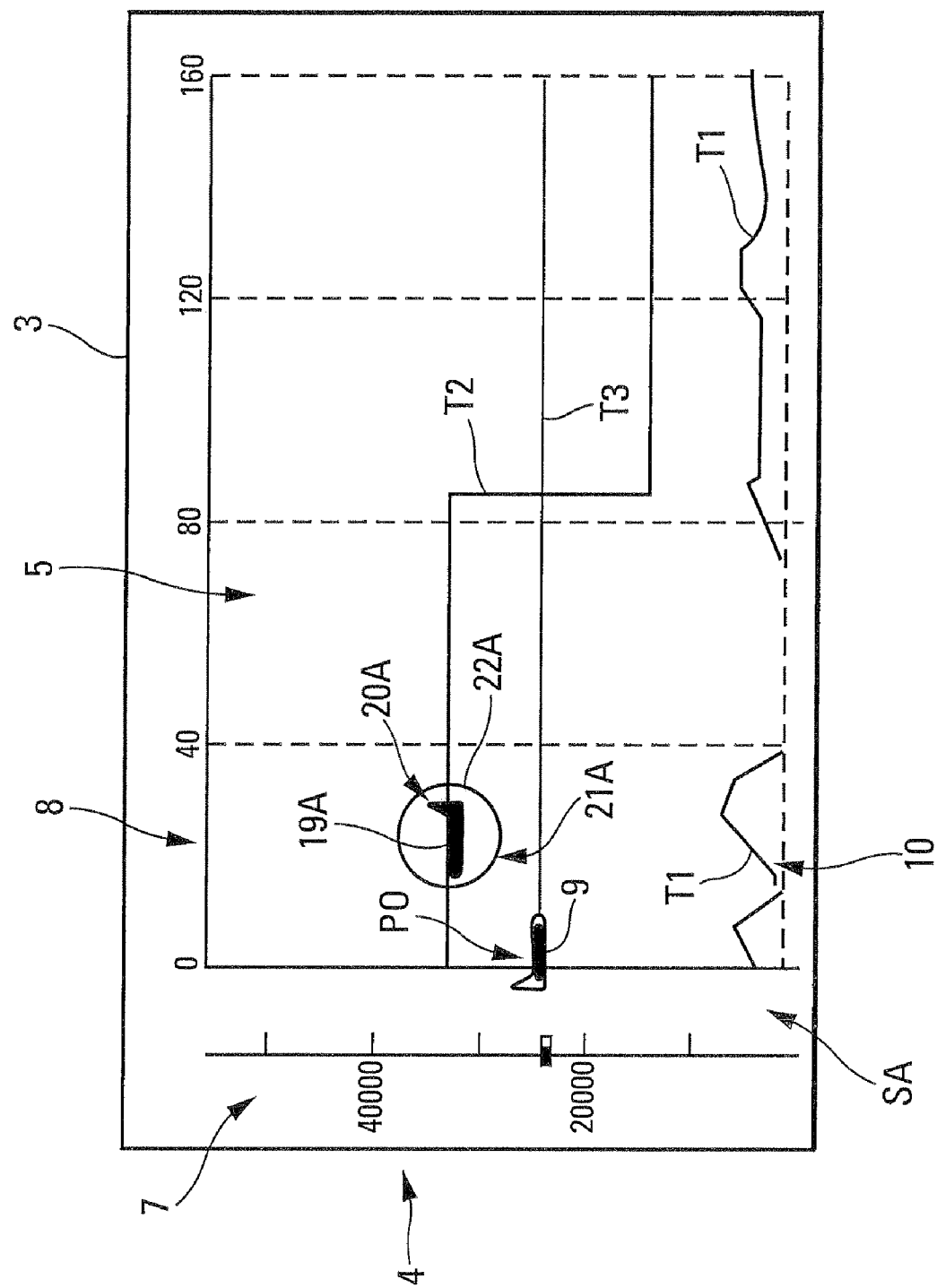
FIGS. 2 to 5 show schematically each time a display window of an assistance device according to the invention, clearly highlighting the essential features of the present invention.

Said set of information 5 illustrates a vertical plane and comprises, as represented in FIG. 2:
- a system of axes SA, of which a Y axis 7 is graduated altitude-wise, preferably expressed in feet (one foot measuring approximately 0.3 meters), and an X axis 8 which is graduated distance-wise from the position of the aircraft illustrated by a characteristic symbol 9, said distance preferably being expressed in nautical miles NM (one nautical mile being approximately 1852 meters);
- said characteristic symbol 9 which represents the aircraft and which is positioned on said Y axis 7 in a position PO representative of the altitude of said aircraft; and, where appropriate
- a standard plot T1, representing the profile of the terrain being flown over and showing a vertical section 10. This plot T1 can be formed according to the current route of the aircraft;
- a standard plot T2, located above the plot T1 and representing . . . ; and
- a straight line segment T3 illustrating the FPA (flight path angle) of the aircraft.

Said device 1 can also comprise a set 12 of information sources, which is linked via a link 13 to said display means 2. Said set 12 of information sources can, in particular, comprise the following means not described in any more detail:
- a central processing unit for acquiring and processing information, for example a flight management system FMS; and
- normal information sources such as navigation instruments and sensors giving information on the state and position of the aircraft, for example.

According to the invention, said device 1 further comprises:
- means 14:
  - that make it possible to automatically monitor the surroundings of said aircraft so as to be able to detect all aircraft in the vicinity that are located in a particular detection space located at least in front of said aircraft; and
  - that comprise incorporated means for determining the actual position of each of the aircraft in the vicinity detected; and
- means 15 that are linked, respectively via links 16 and 17, to said set 12 of sources and to said means 14 and that are formed so as:
  - to verify, for each of the aircraft in the vicinity detected by said means 14, on the basis of the actual positions of said aircraft in the vicinity that are received from said means 14 and from the actual position of the aircraft (on which said device 1 is fitted) which is received from said set 12 of sources, whether a risk of collision between said aircraft and these aircraft in the vicinity exists; and
  - if such a risk exists, to generate corresponding warning information that is especially transmitted via a link 18 to said display means 2.

Furthermore, according to the invention, said display means 2 are formed so as to present, on said display window 3 of said display screen 4, for each of the aircraft in the vicinity, for which warning information has been generated by said means 15:
- an auxiliary characteristic symbol 19A that represents the aircraft in the vicinity in question and is positioned on said system of axes SA at a position 20A that is representative of its actual position, as shown by way of example in FIG. 2; and
- at least one graphical characteristic 21A representing a warning signal, which is associated with this auxiliary characteristic symbol 19A.

This graphical characteristic 21A, which represents a warning signal, may comprise one of the following characteristics:
- at least one particular graph; and/or
- at least one particular color; and/or
- at least one particular shape; and/or
- one particular size.

As an illustration, in the example shown in FIG. 2, said graphical characteristic 21A corresponds to displaying, in red, said auxiliary characteristic symbol 19A, and corresponds to the display of a circle 22A, for example also in red, which surrounds this auxiliary characteristic symbol 19A. Other alternative embodiments of a graphical characteristic are of course possible.

Thus, the device 1 according to the invention supplies the pilot of the aircraft with a graphical representation that gives him a readily understandable and legible presentation of the actual situation of his surroundings, in the vertical plane, displaying (by means of said graphical characteristic 21A) any aircraft in the vicinity, for which a risk of collision with its aircraft exists. In addition, to make it easier to understand the actual situation, the vertical position of each aircraft in the vicinity representing such a hazard is displayed (for example by means of the corresponding auxiliary characteristic symbol 19A) in a vertical plane, on which said aircraft (characteristic symbol 9) is also shown.

In one particular embodiment, said set 12 of sources is formed so as to determine, in particular:
- the actual position of the aircraft on which the device 1 is fitted;
- the path of this aircraft;
- a database of the terrain, in particular allowing the plot T1 to be produced; and flight parameters of the aircraft, such as its ground speed or its vertical speed for example.

Furthermore, as indicated above, said means 14 are formed so as to determine at least the actual position, whether absolute or relative, of the various aircraft in the vicinity.

As indicated previously, said means 14 perform a surveillance of the surroundings in a detection space. This detection space can correspond to any space around the aircraft, where said means 14 are technically able to perform a detection. It can also correspond (solely) to the space that can be displayed on the display screen 4.

Moreover, so as to be able to provide the pilot with the best warning when there is a risk of collision, the device 1 according to the invention includes, in addition, audible warning means 24, of the usual type, which are connected via a link 25 to said means 15 and are formed so as to emit an audible warning signal when the means 15 generate warning information.

In one particular embodiment, said means 15:
  determine, for each aircraft in the vicinity that is detected by the means 14:
    a horizontal distance corresponding to the distance in a horizontal plane between the actual distance of the aircraft (on which the device 1 is fitted) and the actual position of said aircraft in the vicinity;
    a vertical distance corresponding to the distance in a vertical plane between the actual position of said aircraft and the actual position of said aircraft in the vicinity; and
    an approach speed between said aircraft and said aircraft in the vicinity; and
  generate warning information when at least one of the following two conditions A and B is met:
    A/ said horizontal distance is greater than a first threshold value and said vertical distance is greater than a second threshold value;
    B/ said approach speed is greater than a third threshold value.

Figure 3:
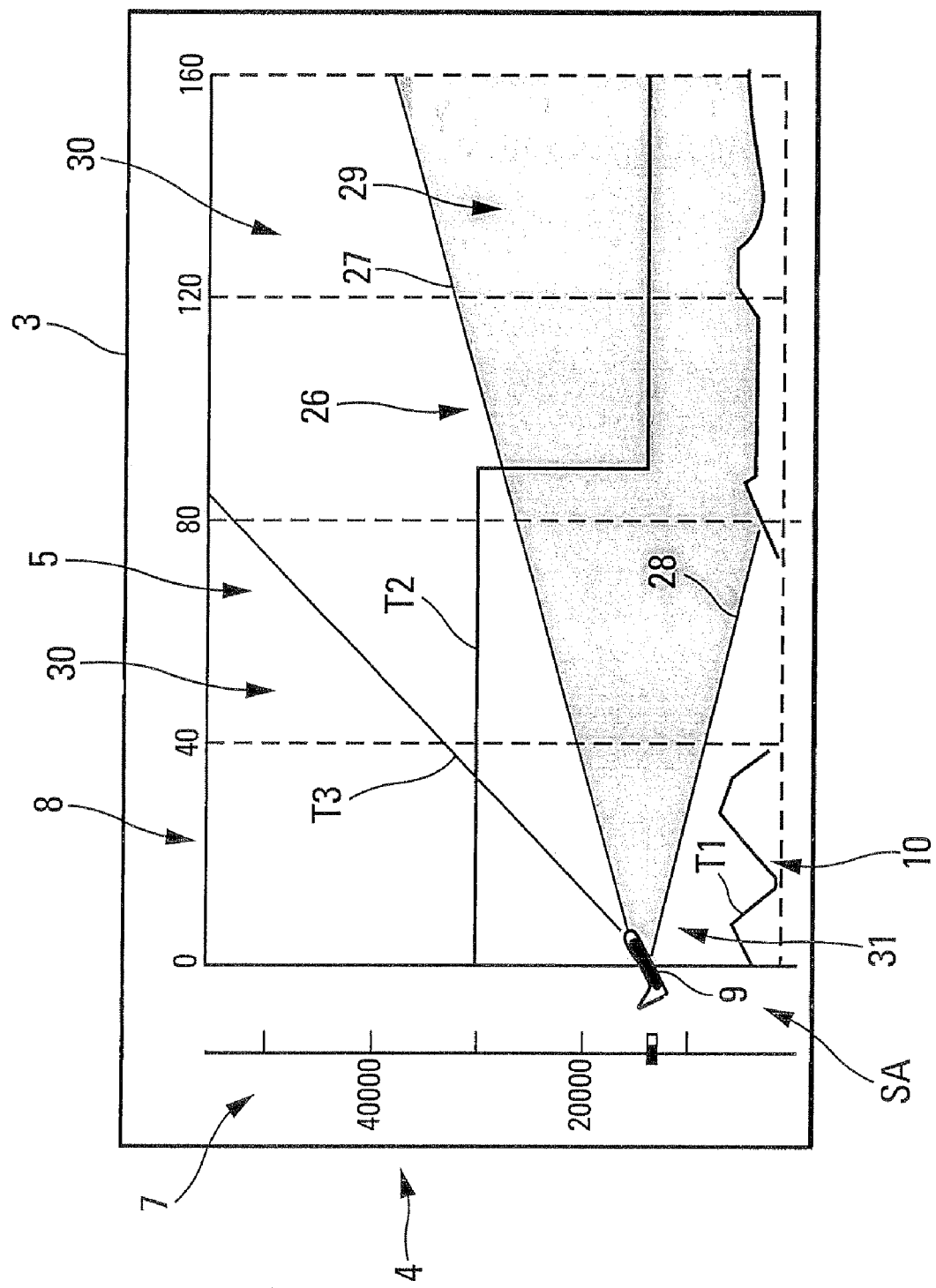
Figure 4:
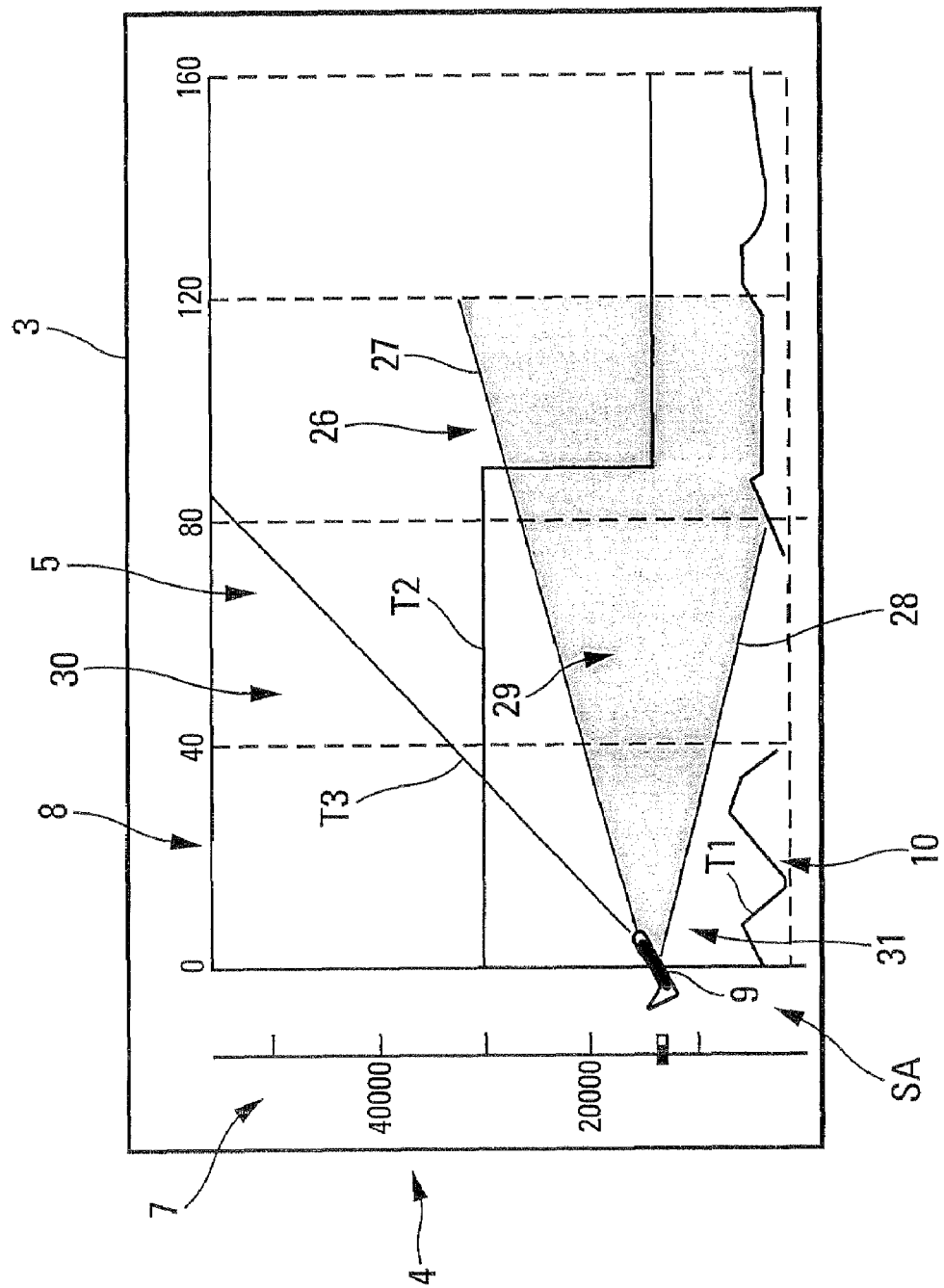

Moreover, in a preferred embodiment:
  said means 15 also generate, for at least one aircraft in the vicinity for which warning information has been generated, avoidance information (or conflict resolution advice) indicating to the pilot of the aircraft one way of avoiding this aircraft in the vicinity; and
  said display means 2 are formed so as to present, on the display screen 4, at least one auxiliary indication means 26 presenting this avoidance information, as shown in FIGS. 3 and 4.

Thus, the device 1 provides the pilot of the aircraft, by displaying said auxiliary indication means 26, indications that allow him to perform an avoidance maneuver should there be a risk of collision with an aircraft in the vicinity.

Preferably, this indication means 26 comprises two indicators 27 and 28 which each illustrate a limiting flight angle and form an internal zone 29 and external zones 30 and 31. Said internal zone 29 is a forbidden zone, and the external zones 30 and 31 are permitted zones. In addition, said display means 2 present, on the display screen 4, in association with the characteristic symbol 9, said straight line segment T3 that illustrates the actual flight angle of the aircraft which is for example determined by the set 12 of sources.

Thus, it is sufficient for the pilot to fly his aircraft so as to bring its flight angle (represented by said straight line segment T3) into said permitted zone 30, that is to say outside the forbidden zone 29. The zone 31 is of course not recommended, since in this zone there is a risk of collision with the terrain being overflown. In a preferred embodiment, said zones 29, 30 and 31 are displayed respectively by means of different colors, for example a red color for the forbidden zone 29 and a green color for the permitted zones 30 and 31.

Thus, the device 1 displays, on the display screen 4, a flight angle zone 30 for which a flight angle allows the conflict to be resolved, relative to a flight angle zone 29 for which the flight angle generates a greater conflict. Such a display allows the mental representation by the pilot of the avoidance information (or conflict resolution advice) to be improved.

In the example shown in FIG. 4, the size of the zones 29 and 30 is limited in terms of distance (relative to the symbol 9). This allows visual and luminous contamination caused by large entirely colored (and lit) zones to be avoided. Such a limitation is especially advantageous when night vision goggles are being worn.

Figure 5:
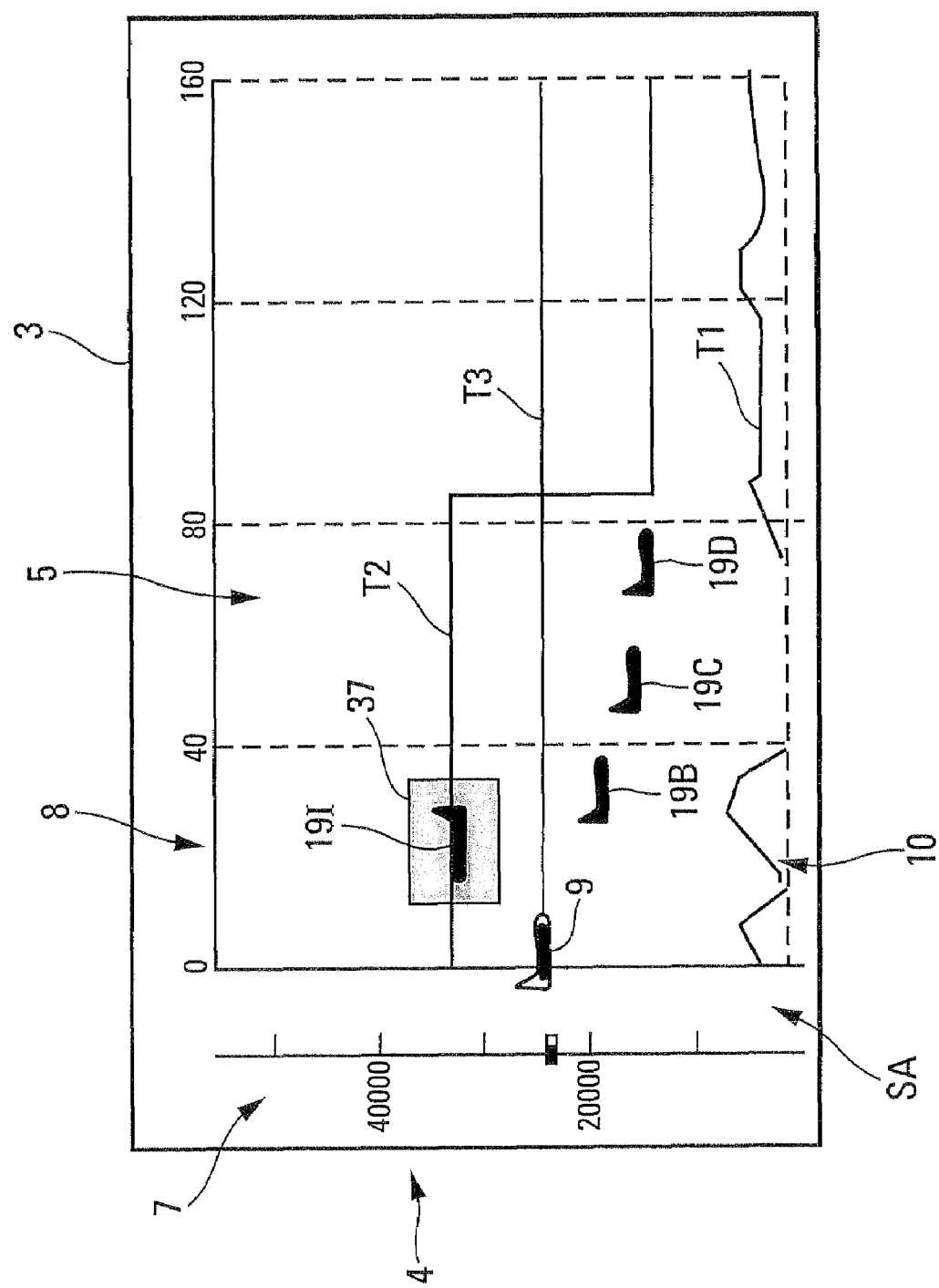

Moreover, in one particular embodiment shown in FIG. 5, a device 1 has, on the display screen 4, an auxiliary characteristic symbol 19B, 19C, 19D, 19I (as mentioned above) for each aircraft in the vicinity detected by the means 14, even if no warning information has been generated for this aircraft in the vicinity by the means 15. This allows the pilot to be provided with complete representation of the airspace surrounding his aircraft, giving both the positions of the aircraft representing a collision hazard and those of aircraft that do not.

In this case, in one particular embodiment, the device 1 displays, on the display screen 4, the auxiliary characteristic symbols corresponding to aircraft in the vicinity that are located outside a corridor defined on either side of a flight path (for example the planned flight path) of the aircraft.

It should be noted that the device 1 according to the invention is particularly suitable for being fitted on an aircraft forming part of an aircraft patrol. In addition, to assist the pilot in such a situation, the auxiliary characteristic symbols 19B, 19C and 19D representing the aircraft in the vicinity that form part of said patrol are advantageously differentiated, on the display screen 4, from the auxiliary characteristic symbols 19I representing the aircraft in the vicinity that do not form part of said patrol. In the example shown in FIG. 5, this differentiation is displayed in particular by a gray background 37 that is associated with the auxiliary characteristic symbol 19I.

Figure 6:
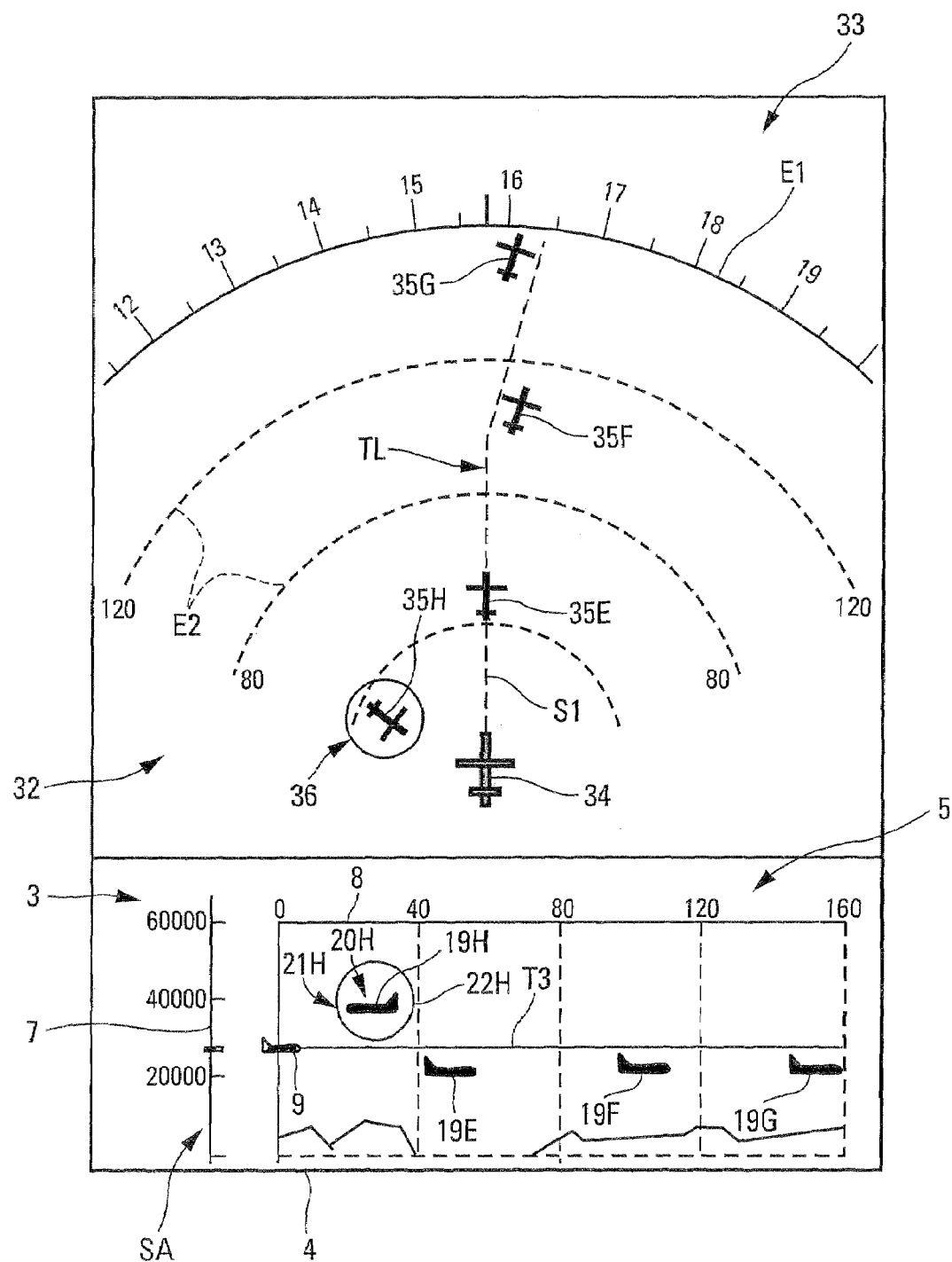
FIG. 6 illustrates schematically a particular display screen of an assistance device according to the invention.

Moreover, in a preferred embodiment, the screen 4 is a navigation screen, of the ND (Navigation Display) type, which comprises, in addition to the window 3 located in its bottom part 6A, a window 32 located in its top part 6B, as represented in FIGS. 1 to 6. The window 32 comprises a set of information 33 that corresponds to a normal presentation on a navigation screen and illustrates the situation of the aircraft (lateral flight plane) in a horizontal plane. This set of information 33 comprises in particular, as represented in FIG. 6:
  a symbol 34 illustrating the position of the aircraft;
  a plot TL representing the lateral flight path, that is, the flight path T0 of the aircraft in the horizontal plane. The corresponding vertical path TV is displayed in the window 3;
  an angular separation graduation E1;
  a distance graduation E2; and
  auxiliary characteristic symbols 35E, 35F, 35G and 35H located in the horizontal positions of aircraft in the vicinity that are shown, in the set of information 5 relative to the vertical plane, by auxiliary characteristic symbols 19E, 19F, 19G and 19H, respectively.

In the example shown in FIG. 6, the aircraft illustrated by the symbols 9, 19E, 19F and 19G are flying in patrol. In addition, the aircraft in the vicinity that is illustrated by the characteristic symbol 19H (or 35H) located at a position 20H runs the risk of colliding with the aircraft equipped with the device 1 and represented by the symbol 9. This risk is displayed on the set of information 5 by a graphical characteristic 21H provided with a circle 22H, for example in red, and on the set of information 33 by a graphical characteristic 36 (which is for example similar to this graphical characteristic 21H).

Thus, by associating with the graphical representation in the vertical plane (set of information 5) according to the invention, a graphical representation in the horizontal plane (set of information 33) of the normal type, the device 1 makes it possible for the pilot to improve the perception of the actual situation of his surroundings, since the representation in the horizontal plane provides additional information, such as the bearings of the aircraft in the vicinity for example. The pilot may thus have, at a single glance, a consistent and full view of the nature of a flight path conflict and of the best way of avoiding it.

The invention claimed is:

1. A method for assisting in the piloting of an aircraft, a method whereby there is displayed, on at least one display screen of said aircraft, a set of information that illustrates a vertical plane and that comprises:
   a system of axes (SA), of which a Y axis is graduated altitude-wise, and an X axis is graduated distance-wise from the position of the aircraft;
   a characteristic symbol representing the aircraft, which is positioned on said Y axis, in a position representative of the altitude of said aircraft, and
   where appropriate, an auxiliary characteristic symbol that represents an aircraft in the vicinity and that is positioned on said system of axes at a position representative of its actual position, said method comprising, during a flight of the aircraft:
   a) carrying out automatic surveillance of the surroundings of said aircraft, so as to be able to detect all aircraft in the vicinity that are located in a particular detection space situated at least in front of said aircraft; and
   b) for each of the aircraft in the vicinity detected in step a):
      b1) its actual position is determined; and
      b2) at least on the basis of this actual position of the aircraft in the vicinity, a verification is made as to whether a risk of collision with said aircraft exists and, if such a risk exists, warning information is generated and to do this:
         the actual position of said aircraft is also determined;
         for each of the aircraft in the vicinity that is detected in step a), the following are determined:
            a horizontal distance corresponding to the distance in a horizontal plane between the actual position of the aircraft and the actual position of said aircraft in the vicinity;
            a vertical distance corresponding to the distance in a vertical plane between the actual position of said aircraft and the actual position of said aircraft in the vicinity; and
            an approach speed between said aircraft and said aircraft in the vicinity; and
         warning information is generated when at least one of the following two conditions A and B is met:
            A/ said horizontal distance is greater than a first threshold value and said vertical distance is greater than a second threshold value;
            B/ said approach speed is greater than a third threshold value; and
   c) for each of the aircraft in the vicinity, for which warning information has been generated in step b2), an auxiliary characteristic symbol, which represents said aircraft in the vicinity and is positioned on said system of axes (SA) at a position representative of its actual position, is presented on said display screen and at least one graphical characteristic representing a warning signal is associated with this auxiliary characteristic symbol.

2. The method as claimed in claim 1,
wherein:
   between step b2) and step c), for at least one aircraft in the vicinity for which warning information has been generated, avoidance information is generated in a step b3), indicating to the pilot of the aircraft one way of avoiding said aircraft in the vicinity; and
   in step c), at least one auxiliary indication means providing this avoidance information is also presented on the display screen.

3. The method as claimed in claim 2,
wherein said auxiliary indication means comprises at least one indicator illustrating a limiting flight angle above which the aircraft can perform an avoidance maneuver.

4. The method as claimed in claim 1,
wherein the following operations are also carried out:
   a flight angle of said aircraft is determined; and
   in step c) a straight line segment illustrating this flight angle is also presented on the display screen in association with said characteristic symbol.

5. The method as claimed in claim 1,
wherein, in step c), an audible warning signal is emitted for at least one item of warning information generated in step b2).

6. The method as claimed in claim 1,
wherein, in step c), an auxiliary characteristic symbol is presented on the display screen for any aircraft in the vicinity detected in step a), even if no warning information has been generated for this aircraft in the vicinity in step b2).

7. The method as claimed in claim 6,
wherein, in step c), the auxiliary characteristic symbols corresponding to aircraft in the vicinity that are located outside a corridor defined on either side of a flight path of the aircraft are displayed on the display screen.

8. The method as claimed in claim 6, for assisting in the piloting of an aircraft forming part of an aircraft patrol,
wherein, in step c), the auxiliary characteristic symbols representing the aircraft in the vicinity that form part of said patrol are differentiated, on the display screen, from the auxiliary characteristic symbols representing the aircraft in the vicinity that do not form part of said patrol.

9. The method as claimed in claim 1,
wherein said display screen comprises at least two display windows, of which a first window comprises said set of information and a second window comprises a set of additional information that illustrates a horizontal plane and that comprises:
   a system of axes graduated distance-wise and bearing-wise;

a characteristic symbol illustrating the aircraft; and auxiliary characteristic symbols illustrating the aircraft in the vicinity that have been detected, and where appropriate provided with a graphical characteristic representative of a warning signal.

10. A device for assisting in the piloting of an aircraft, said device comprising display means that can present, on at least one display screen of said aircraft, a set of information that illustrates a vertical plane and that comprises:

a system of axes, of which a Y axis is graduated altitude-wise, and an X axis is graduated distance-wise from the position of the aircraft;

a characteristic symbol representing the aircraft, that is positioned on said Y axis in a position representative of the altitude of said aircraft; and where appropriate, an auxiliary characteristic symbol that represents an aircraft in the vicinity and that is positioned on said system of axes at a position representative of its actual position, wherein:

said device further comprises:

a set of information sources for determining the actual position of said aircraft;

first means for performing an automatic surveillance of the surroundings of said aircraft so as to be able to detect all aircraft in the vicinity that are located in a particular detection space situated at least in front of said aircraft;

second means for determining the actual position of each of the aircraft in the vicinity detected by said first means; and third means for verifying, for each of said aircraft in the vicinity detected, at least on the basis of said actual positions, whether a risk of collision with said aircraft exists and, if such a risk exists, for generating corresponding warning information;

said third means are formed so as:

to determine, for each aircraft in the environment that is detected by said first means:

a horizontal distance corresponding to the distance in a horizontal plane between the actual position of the aircraft and the actual position of said aircraft in the vicinity;

a vertical distance corresponding to the distance in a vertical plane between the actual position of said aircraft and the actual position of said aircraft in the vicinity; and an approach speed between said aircraft and said aircraft in the vicinity; and to generate warning information when at least one of the two following conditions A and B is met:

A/ said horizontal distance is greater than a first threshold value and said vertical distance is greater than a second threshold value;

B/ said approach speed is greater than a third threshold value; and said display means are formed to display, on said display screen for each of the aircraft in the vicinity for which warning information has been generated by said third means:

an auxiliary characteristic symbol that represents the aircraft in the vicinity concerned and that is positioned on said system of axes (SA) in a position representative of its actual position; and at least one graphical characteristic representing a warning signal, which is associated with this auxiliary characteristic symbol.

11. An aircraft, which comprises a device that can implement the method specified under claim 1.

12. The aircraft, which comprises a device such as that specified under claim 10.

\* \* \* \* \*